United States Patent
Kampe et al.

[11] 3,817,981
[45] June 18, 1974

[54] N-(6)-ARALKYL-ADENOSINE COMPOUNDS

[75] Inventors: Wolfgang Kampe, Heddesheim; Erich Fauland, Mannheim-Waldhof; Harald Stork, Mannheim-Feudenheim; Wolfgang Juhran, Mannheim; Karl Dietmann, Mannheim-Vogelstang, all of Germany

[73] Assignee: Boehringer Mannheim, GmbH, Mannheim, Germany

[22] Filed: Nov. 17, 1971

[21] Appl. No.: 199,727

[30] Foreign Application Priority Data
Dec. 5, 1970    Germany............... 2059922

[52] U.S. Cl............... 260/211.5 R, 424/180
[51] Int. Cl............................. C07d 51/54
[58] Field of Search................... 260/211.5 R

[56] References Cited
UNITED STATES PATENTS
3,502,649  3/1970   Thiel et al............ 260/211.5 R
3,551,409  12/1970  Kampe et al......... 260/211.5 R
3,590,029  6/1971   Koch et al............ 260/211.5 R Primary Examiner—Johnnie R. Brown
Attorney, Agent, or Firm—Burgess, Dinklage & Sprung

[57] ABSTRACT

Novel N(6)-Aralkyl-Adenosine Compounds of the formula

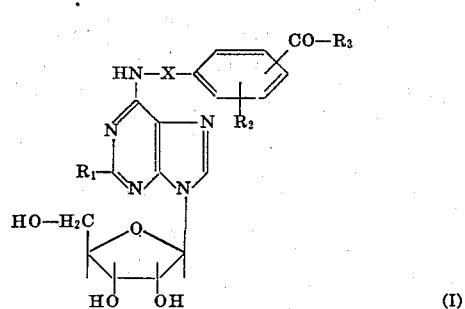

(I)

wherein $R_1$ is hydrogen, halogen or hydroxyl; $R_2$ is hydrogen, halogen, hydroxyl, alkyl or alkoxy; $R_3$ is hydroxyl, amino, alkoxy, alkylamino or dialkylamino; and X is straight or branched-chain alkylene containing up to 3 carbon atoms; and the physiologically compatible salts thereof, are outstandingly effective in producing a prolonged coronary vasodilating effect, and furthermore, are effective in depressing serum lipids.

18 Claims, No Drawings

N-(6)-ARALKYL-ADENOSINE COMPOUNDS

The present invention is concerned with new N(6)-aralkyl-adenosine compounds, with pharmaceutical compositions containing the new adensoine compounds, and the uses thereof.

The new N(6)-aralkyl-adenosine derivatives according to the present invention are compounds of the general formula:

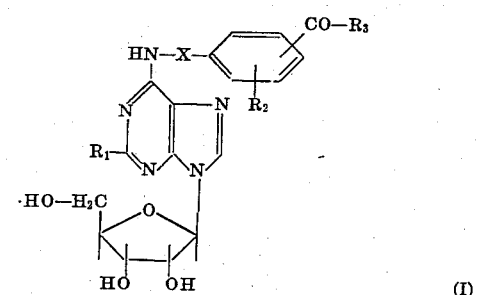

(I)

wherein $R_1$ is hydrogen, halogen or hydroxyl; $R_2$ is hydrogen, halogen, hydroxyl, alkyl or alkoxy; $R_3$ is hydroxyl, amino, alkoxy, alkylamino or dialkylamino; and X is straight or branched-chain alkylene containing up to 3 carbon atoms; and the physiologically compatible salts thereof.

The alkyl and alkoxy radicals in the compounds (I) are preferably lower alkyl and alkoxy, e.g., of up to 6 carbons.

We have found that the new compunds (I) have a surprisingly good circulatory activity and, furthermore, bring about a considerable depression of the serum lipids.

The new compounds (I) can be prepared, for example, by one of the following methods:

a. reaction of a purine riboside of the general formula:

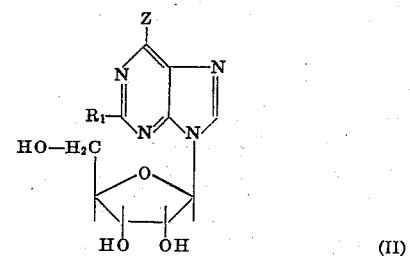

(II)

wherein $R_1$ has the same meaning as above and Z is a halogen atom or a reactive mercapto group, with an amine of the general formula:

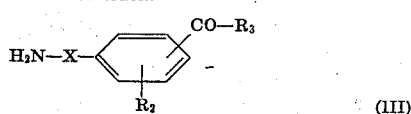

(III)

wherein X, $R_2$ and $R_3$ have the same meaning as above, optionally with temporary blocking or protecting of the hydroxyl groups of the sugar residue: or b. heating a $N^1$-substituted adenosine derivative of the general formula:

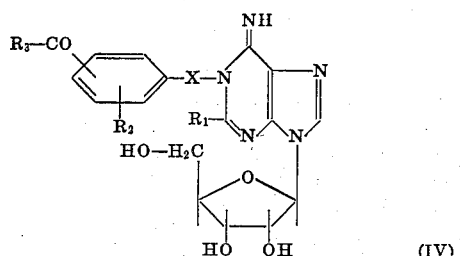

(IV)

wherein X, $R_1$, $R_2$ and $R_3$ have the same meanings as above, or a derivative thereof in which the hydroxyl groups of the sugar residue are protected, in alkaline solution and the protective groups, when present, subsequently removed by acidic saponification, whereupon a compound of general formula (I), in which $R_3$ is an alkoxy radical, is, if desired, converted in known manner into a compound in which $R_3$ is a hydroxyl or amino group or an alkylamino or dialkylamino radical, and the compound (I) obtained is, if desired, converted into a physicologically compatible salt thereof.

Reactive mercapto groups Z in the starting materials (II) are preferably methylmercapto or benzylmercapto radicals.

As intermediate blocking or protective groups for the hydroxyl groups in the sugar residues, there can be used, for example, acyl (i.e., alkanoyl) derivatives and cyclic acetals and ketals. The acyl radicals are preferably removed by alkaline saponification, whereas the cyclic acetals or ketals can be split by acidic hydrolysis, preferably with the use of formic acid or of a dilute mineral acid.

The compounds (IV) used as starting materials can be prepared by the reaction of adenosine or of its acyl derivatives or acetals or ketals with conventional N-alkylation agents. There are preferably used compounds of the general formula:

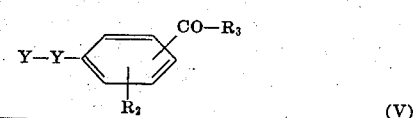

(V)

wherein X, $R_2$ and $R_3$ have the above-given meanings and Y is a reactive residue, such as halogen atom, an aliphatic or aromatic sulphonyl radical or the like.

According to a preferred variant of this process, the compound (IV) is not isolated: the solution is rendered weakly alkaline and then heated for a short period of time. In this way, the compounds (I) or the corresponding acyl derivatives or the acetals or ketals are obtained directly and subsequently split by bases or acids to give the free adenosine derivatives.

When reacting the purine-riboside derivatives (II) with the benzylamines (III), the compounds are preferably heated together in a solvent and the reaction mixture then worked up in the usual way.

The subsequent conversion of compounds of general formula (I), in which $R_3$ is an alkoxy radical, into compounds in which $R_3$ is a hydroxyl group is brought about by alkaline saponification; the compounds in which $R_3$ is an amino group or an alkylamino or dialkylamino radical can be obtained by reaction with ammonia or with alkylamines or dialkylamines.

The physiologically compatible salts can be obtained in the usual manner, for example, by neutralization of the compounds (I) with non-toxic inorganic or organic acids, for example, with hydrochloric acid, sulphuric acid, phosphoric acid, hydrobromic acid, acetic acid, lactic acid, citric acid, malic acid, salicyclic acid, malonic acid, maleic acid or succinic acid.

The following Examples are given for the purpose of illustrating the present invention and should not be construed as unduly limitative thereof:

EXAMPLE 1

Preparation of N(6)-(3-Ethoxycarbonyl-benzyl)-adenosine.

2.86 g. 6-chloro-9-(β-D-ribofuranosyl)-purine, 2.35 g. 3-ethoxycarbonyl-benzylamine hydrochloride and 5.5 ml. triethylamine were heated under reflux for 4 hours in 75 ml. alcohol. The crystals which separate upon standing overnight were filtered off with suction and recrystallized from alcohol. There were obtained 3.3 g. (77 percent of theory) N(6)-(3-ethoxycarbonyl-benzyl)-adenosine, which had a melting point of 130°–135°C.

EXAMPLE 2

Preparation of N(6)-(3-Ethoxycarbonyl-2-methyl-benzyl)-adenosine.

2.86 g. 6-chloro-9-(β-D-ribofuranosyl)-purine and 2.80 g. 3-ethoxycarbonyl-2-methyl-benzylamine hydrochloride were heated to 60°C. in 100 ml. water. 3.3 ml. triethylamine were added dropwise to this reaction mixture so that the solution always remained weakly alkaline about (pH 8). After about 1.5 hours, 20 ml. ethanol were added thereto and the reaction mixture left to stand overnight. The precipitate which formed was filtered off with suction and recrystallized from alcohol. There was obtained 1.6 g. (36 percent of theory) N(6)-(3-ethoxycarbonyl-2-methyl-benzyl)-adenosine, which had a melting point of 138° – 139°C. A further 2 g. of this compound could be isolated from the mother liquor.

EXAMPLE 3

Preparation of N(6)-(4-methoxycarbonyl-phenethyl)-adenosine.

8.5 g. triacetyl-6-chloro-9-(β-D-ribofuranosyl)-purine, 4.95 g. 4-methoxycarbonyl-phenethylamine hydrochloride and 5.0 g. triethylamine were heated under reflux for 2 hours in 100 ml. isopropanol. After cooling, the reaction mixture was mixed with 300 ml. ether and the precipitate which formed was filtered off with suction. The filtrate was washed with 100 ml. water, dried and evaporated. The evaporation residue was dissolved in 150 ml. methanol and mixed with 1 ml. 1N sodium methylate solution. The precipitate which formed in the course of 2 hours was filtered off with suction and recrystallized from methanol, with the addition of some dimethyl formamide. There were obtained 4.0 (53 percent of theory) N(6)-(4-methoxycarbonyl-phenethyl)-adenosine, which had a melting point of 183° – 184°C.

EXAMPLE 4

Preparation of N(6)-(4-ethoxycarbonyl-benzyl)-2-chloroadenosine.

3.2 g. 2.6-dichloro-9-(β-D-ribofuranosyl)-purine, 2.4 g. 4-ethoxycarbonyl-benzylamine hydrochloride and 4.0 g. triethylamine were boiled under reflux for 3 hours in 40 ml. alcohol. The reaction mixture was then evaporated in a vacuum and the residue taken up in benzene. The benzene phase was washed with water, dried and evaporated. The residue was recrystallized twice from alcohol/water. There was obtained 1.0 g. (22 percent of theory) N(6)-(4-ethoxycarbonyl-benzyl)-2-chloroadenosine, which had a melting point of 188° – 190°C.

In an analogous manner, there were obtained the following compounds:

a. by the reaction of 6-chloro-9-(β-D-ribofuranosyl)-purine with 3-methoxycarbonyl-benzylamine hydrochloride:

N(6)-(3-methoxycarbonyl-benzyl)-adenosine; m.p. 95° – 97°C.; yield 85% of theory;

b. by the reaction of 6-chloro-9-(β-D-ribofuranosyl)-purine with 2-ethoxycarbonyl-benzylamine hydrochloride:

N(6)-(2-ethoxycarbonyl-benzyl)-adenosine; m.p. 150° – 107°C.; yield 47 percent of theory;

c. by the reaction of 6-chloro-9-(β-D-ribofuranosyl)-purine with 4-ethoxycarbonyl-benzylamine hydrochloride:

N(6)-(4-ethoxycarbonyl-benzyl)-adenosine; m.p. 151° – 153°C.; yield 70 percent of theory;

d. by the reaction of 6-chloro-9-(β-D-ribofuranosyl)-purine with 3-isopropoxycarbonyl-benzylamine hydrochloride:

N(6)-(3-isopropoxycarbonyl-benzyl)-adenosine; m.p. 81° – 83°C.; yield 64 percent of theory;

e. by the reaction of triacetyl-6-chloro-9-(β-D-ribofuranosyl)-purine with 5-ethoxycarbonyl-2-methyl-benzylamine hydrochloride:

N(6)-(5-ethoxycarbonyl-2-methyl-benzyl)-adenosine; m.p. 164° – 165°C.; yield 59 percent of theory:

f. by the reaction of 6-chloro-9-(β-D-ribofuranosyl)-purine with 3-ethoxycarbonyl-phenethylamine hydrochloride:

N(6)-(3-ethoxycarbonyl-phenethyl)-adenosine; m.p. 137° – 138°C.; yield 65 percent of theory;

g. by the reaction of triacetyl-6-chloro-9-(β-D-ribofuranosyl)-purine with 4-ethoxycarbonyl-phenethylamine hydrochloride:

N(6)-(4-ethoxycarbonyl-phenethyl)-adenosine; m.p. 176° – 177°C.; yield 62 percent of theory;

h. by the reaction of triacetyl-6-chloro-9-(β-D-ribofuranosyl)-purine with 4-ethoxycarbonyl-2-methyl-benzylamine hydrochloride:

N(6)-(4-ethoxycarbonyl-2-methyl-benzyl)-adenosine; m.p. 150° – 151°C.; yield 65 percent of theory;

i. by the reaction of triacetyl-2,6-dichloro-9-(β-D-ribofuranosyl)-purine with 3-ethoxycarbonyl-benzylamine hydrochloride:

N(6)-(3-ethoxycarbonyl-benzyl)-2-chloroadenosine; m.p. 167° – 169°C.; yield 30 percent of theory;

j. by the reaction of triacetyl-2,6-dichloro-9-(β-D-ribofuranosyl)-purine with 4-methoxycarbonyl-phenethylamine hydrochloride:

N(6)-(4-methoxycarbonyl-phenethyl)-2-chloroadenosine; m.p. 197° – 198°C.; yield 74 percent of theory;

k. by the reaction of triacetyl-2-bromo-6-chloro-9-(β-D-ribofuranosyl)-purine with 3-ethoxycarbonyl-benzylamine hydrochloride:

N(6)-(3-ethoxycarbonyl-benzyl)-2-bromoadenosine; m.p. 163° – 165°C.; yield 68 percent of theory;

l. by the reaction of triacetyl-2-bromo-6-chloro-9-(β-D-ribofuranosyl)-purine with 4-ethoxycarbonyl-phenethylamine hydrochloride:

N(6)-(4-ethoxycarbonyl-phenethyl)-2-bromoadenosine; m.p. 174° – 176°C.; yield 65 percent of theory;

m. by the reaction of 2°-hydroxy-6-benzylmercapto-9-(β-D-ribofuranosyl)-purine with 3-ethoxycarbonyl-benzylamine hydrochloride:

N(6)-(3-ethoxycarbonyl-benzyl)-2-hydroxy-adenosine; m.p. 168° – 170°C.; yield 18 percent of theory;

n. by the reaction of triacetyl-6-chloro-9-(β-D-ribofuranosyl)-purine with 2-ethoxycarbonylphenethylamine hydrochloride:

N(6)-(2-ethoxycarbonyl-phenethyl)-adenosine; m.p. 107° – 109°C.; yield 23 percent of theory.

EXAMPLE 5

Preparation of N(6)-(4-carboxy-benzyl)-adenosine.

2.0 g. N(6)-(4-ethoxycarbonyl-benzyl)-adenosine (obtained in the manner described in Example 4c) were dissolved in 10 ml. methanol. To this was added a solution of 0.52 g. potassium hydroxide in 1 ml. water. The reaction mixture was left to stand for 2 days at ambient temperature and subsequently heated under reflux for 0.5 hours. The reaction mixture was then evaporated in a vacuum and the residue dissolved in water. The aqueous solution was filtered and acidified with dilute hydrochloride acid. The precipitated, pale yellow material was filtered off and purified by dissolving in a dilute aqueous solution of ammonia and reprecipitating by the addition of acetic acid. There was finally obtained 1.6 g. (85 percent of theory) N(6)-(4-carboxy-benzyl)-adenosine, which had a melting point of 250° – 251°C.

EXAMPLE 6

Preparation of N(6)-(3-carboxy-2-methyl-benzyl)-adenosine.

2.0 g. N(6)-(3-ethoxycarbonyl-2-methyl-benzyl)-adenosine (obtained in the manner described in Example 2) were heated under reflux for 1 hour in 50 ml. water containing 0.5 g. potassium hydroxide. Thereafter, the reaction mixture was acidified with 2N hydrochloric acid and the precipitate formed was filtered off with suction. After recrystallization from 100 ml. methanol, there was obtained 1.5 g. (80 percent of theory) N(6)-(3-carboxy-2-methyl-benzyl)-adenosine, which had a melting point of 204° – 206°C.

In an analogous manner, by saponification of the stated compounds there were obtained the following compounds:

a. N(6)-(2-carboxy-benzyl)-adenosine; m.p. 150° – 151°C,; yield 17.5 percent of theory; from N(6)-(2-ethoxycarbonyl-benzyl)-adenosine (see Example 4b));

b. N(6)-(3-carboxy-benzyl)-adenosine; m.p. 240°C. (decomp.); yield 84 percent of theory; from N(6)-(3-methoxycarbonyl-benzyl)-adenosine (see Example 4a));

c. N(6)-(5-carboxy-2-methyl-benzyl)-adenosine; m.p. 274°C. (decomp.); yield 95 percent of theory; from N(6)-(5-ethoxycarbonyl-2-methyl-benzyl)-adenosine (see Example 4e));

d. N(6)-(3-carboxy-phenethyl)-adenosine; m.p. 205°C. (decomp.); yield 70 percent of theory; from N(-6)-(3-ethoxycarbonyl-phenethyl)-adenosine (see Example 4f));

e. N(6)-(4-carboxy-phenethyl)-adenosine; m.p. 207° – 208°C.; yield 85 percent of theory; from N(6)-(4-methoxycarbonyl-phenethyl)-adenosine (see Example 3);

f. N(6)-(4-carboxy-2-methyl-benzyl)-adenosine; m.p. 263°C. (decomp.); yield 86 percent of theory; from N(6)-(4-ethoxycarbonyl-2-methyl-benzyl)-adenosine (see Example 4h));

g. N(6)-(3-carboxy-benzyl)-2-chloroadenosine; m.p. 250°C. (decomp.) yield 40 percent of theory; from N(-6)-(3-ethoxycarbonyl-benzyl)-2-chloroadenosine.

Example 7

Preparation of N(6)-(3-carbamoyl-benzyl)-adenosine.

8.2 g. triacetyl-6-chloro-9-(β-D-ribofuranosyl)-purine, 4.1g. 3-carbamoyl-benzylamine hydrochloride and 5.5 ml. triethylamine were heated under reflux for 3 hours in 100 ml. isopropanol. After the addition of a further 3 ml. triethylamine, the reaction mixture was heated under reflux for another 2 hours. The reaction mixture was then evaporated in a vacuum, the residue taken up in chloroform and the chloroform solution was repeatedly washed with water. After drying, the chloroform was removed in a vacuum and the residue dissolved in methanol. After the addition of 5 ml. 1N sodium methylate solution, the mixture was heated under reflux for 30 minutes. The precipitate thereby formed was filtered off with suction and recrystallized from a little methanol. There were obtained 5.9 g. (74 percent of theory) N(6)-(3-carbamoyl-benzyl)-adenosine, which had a melting point of 225°C.

EXAMPLE 8

Preparation of N(6)-(3-carbamoyl-phenethyl-adenosine.

2.0 g. N(6)-(3-ethoxycarbonyl-phenethyl)-adenosine (obtained in the manner described in Example 4f)) were dissolved in 200 ml. methanol and heated in an autoclave to 120°C. for 15 hours, after the addition of 50 g. ammonia. Thereafter, the solution was evaported to a volume of about 100 ml. The product crystallized out and was filtered off with suction. There was obtained 1.2 g. (64 percent of theory) N(6)-(3-carbamoyl-phenethyl)-adenosine, which had a melting point of 162° – 164°C.

In an analogous manner, from N(6)-(2-ethoxycarbonyl-benzyl)-adenosine (see Example 4b)) and ammonia there was obtained N(6)-(2-carbamoyl-benzyl)-adenosine, which had a melting point of 130°C. (decomp.); yield 22.5 percent of theory.

EXAMPLE 9

Preparation of N(6)-(4-carbamoyl-benzyl)-2-chloroadenosine.

4.5 g. triacetyl-2,6-dichloro-9-(β-D-ribofuranosyl)-purine, 2.8 g. 4-carbamoyl-benzylamine hydrochloride and 4 g. triethylamine were kept at ambient temperature for 24 hours in 50 ml. anhydrous tetrahydrofuran and thereafter heated under reflux for 2 hours. The reaction mixture was worked up in the usual manner and the residue mixed with methanol saturated with ammonia. After standing overnight, the reaction mixture was evaporated and the residue recrystallized from methanol/water. There was obtained 1.0 g. (23 percent of theory) N(6)-(4-carbamoyl-benzyl)-2-chloroadenosine, which had a melting point of 190° – 192°C.

In an analogous manner, there were obtained the following compounds:

a. by the reaction of triacetyl-6-chloro-9-(β-D-ribofuranosyl)-purine with 4-carbamoyl-benzylamine hydrochloride:

N(6)-(4-carbamoyl-benzyl)-adenosine; m.p. 181° – 183°C.; yield 80 percent of theory;

b. by the reaction of triacetyl-6-chloro-9-(β-D-ribofuranosyl)-purine with 5-carbamoyl-2-methyl-benzylamine hydrochloride:

N(6)-(5-carbamoyl-2-methyl-benzyl)-adenosine; m.p. 220° – 222°C.; yield 59 percent of theory;

c. by the reaction of triacetyl-6-chloro-9-(β-D-ribofuranosyl)-purine with 4-carbamoyl-phenethylamine hydrochloride:

N(6)-(4-carbamoyl-phenethyl)-adenosine; m.p. 203° – 204°C.; yield 44 percent of theory;

d. by the reaction of triacetyl-6-chloro-9-(β-D-ribofuranosyl)-purine with 3-carbamoyl-2-methyl-benzylamine hydrochloride:

N(6)-(3-carbamoyl-2-methyl-benzyl)-adenosine; m.p. 235° – 237°C.; yield 40 percent of theory, e. by the reaction of triacetyl-6-chloro-9-(β-D-ribofuranosyl)-purine with 4-carbamoyl-2-methyl-benzylamine hydrochloride;

N(6)-(4-carbamoyl-2-methyl-benzyl)-adenosine; m.p. 144° – 146°C.; yield 71 percent of theory;

f. by the reaction of triacetyl-2,6-dichloro-9-(β-D-ribofuranosyl)-purine with 4-carbamoyl-phenethylamine hydrochloride:

N(6)-(4-carbamoyl-phenethyl)-2-chloroadenosine; m.p. 135° – 138°C.; yield 27 percent of theory;

g. by the reaction of triacetyl-2-bromo-6-chloro-9-(β-D-ribofuranosyl)-purine with 4-carbamoyl-benzylamine hydrochloride:

N(6)-(4-carbamoyl-benzyl)-2-bromoadenosine; m.p. 210° – 212°C.; yield 64 percent of theory;

h. by the reaction of 2-hydroxy-6-benzylmercapto-9-(β-D-ribofuranosyl)-purine with 4-carbamoyl-benzylamine hydrochloride:

N(6)-(4-carbamoyl-benzyl)-2-hydroxy-adenosine; m.p. 185° – 188°C.; yield 14 percent of theory.

EXAMPLE 10

Preparation of N(6)-(2-methylaminocarbonyl-benzyl)-adenosine.

A solution of 2.0 g. N(6)-(2-ethoxycarbonyl-benzyl)-adenosine (obtained in the manner described in Example 4b)) in 50 ml. 30 percent aqueous methylamine was maintained at 40°C. for 3 hours. Thereafter, the reaction mixture was evaporated in a vacuum and the residue crystallized from 15 ml. water with the addition of 3 drops of 1N sodium hydroxide solution. After working up the mother liqour, there was obtained, in all, 1.45 g. (75 percent of theory) N(6)-(2-methylaminocarbonyl-benzyl)-adenosine, which had a melting point of 114° – 115°C.

EXAMPLE 11

Preparation of N(6)-(3-methylaminocarbonyl-phenethyl)-adenosine.

2.0 g. N(6)-(3-ethoxycarbonyl-phenethyl)-adenosine (obtained in the manner described in Example 4f)) were dissolved in 50 ml. 30 percent methanolic methylamine. The reaction mixture was left to stand for 6 days at ambient temperature. Thereafter, it was evaporated in a vacuum and the residue recrystallized from 100 ml. methanol. There was obtained 1.5 g. (78 percent of theory) N(6)-(3-methylaminocarbonyl-phenethyl)-adenosine, which had a melting point of 130° – 132°C.

In an analogous manner, there were obtained from methylamine and the stated starting compound, the following compounds:

a. N(6)-(3-methylaminocarbonyl-benzyl)-adenosine; m.p. 158° – 160°C,; yield 90 percent of theory; from N-(6)-(3-methoxy-carbonyl-benzyl)-adenosine (see Example 4a));

b. N(6)-(4-methylaminocarbonyl-benzyl)-adenosine; m.p. 165° – 167°C.; yield 83 percent of theory; from N-(6)-(4-ethoxy-carbonyl-benzyl)-adenosine (see Example 4c));

c. N(6)-(3-methylaminocarbonyl-2-methyl-benzyl)-adenosine; m.p. 192° – 194°C.; yield 30 percent of theory; from N(6)-(3-ethoxycarbonyl-2-methyl-benzyl)-adenosine (see Example 2);

d. N(6)-(4-methylaminocarbonyl-phenethyl)-adenosine; m.p. 110° – 112°C.; yield 53 percent of theory; from N(6)-(4-ethoxy-carbonyl-phenethyl)-adenosine (see Example 4g));

e. N(6)-(4-methylaminocarbonyl-phenethyl)-2-bromoadenosine; m.p. 186° – 187°C.; yield 40 percent of theory; from N(6)-(4-ethoxycarbonyl-phenethyl)-2-bromoadenosine (see Example 4l)).

The alkoxycarbonyl-benzylamine hydrochloride used as starting materials were obtained from the corresponding alkoxycarbonyl-anilines by introduction of a nitrile group by the sandmeyer method and subsequent hydrogenation in the presence of palladium/charcoal. The carbamoyl and alkyl-carbamoyl derivatives were obtained by hydrogenation of the corresponding carbamoyl and alkylcarbamoyl-benzonitriles or by treatment of the alkoxycarbonyl-benzylamine hydrochlorides with ammonia or amines.

The alkoxycarbonyl-phenethylamine hydrochlorides were obtained by the catalytic hydrogenation of the alkoxy-carbonyl-benzyl cyanides, which would be prepared from alkoxy-carbonyl-benzyl halides and sodium or potassium cyanide. The corresponding carbamoyl derivatives were prepared by one of the processes mentioned above.

In the following Table are listed the amine hydrochlorides of general formula (III) which are used as starting materials:

Table

| compound | m.p. °C (hydrochloride) |
| --- | --- |
| 2-ethoxycarbonyl-benzylamine | 186 – 188 |
| 3-ethoxycarbonyl-benzylamine | 158 – 160 |
| 3-methoxycarbonyl-benzylamine | 177 – 179 |
| 3-isopropoxycarbonyl-benzylamine | 150 – 152 |
| 4-ethoxycarbonyl-benzylamine | 251 – 253 |
| 3-carbamoyl-benzylamine | 205 – 206 |
| 4-carbamoyl-benzylamine | 255 – 257 |
| 3-ethoxycarbonyl-2-methyl-benzylamine | 192 – 194 |
| 4-ethoxycarbonyl-2-methyl-benzylamine | 226 – 228 |
| 5-ethoxycarbonyl-2-methyl-benzylamine | 221 – 222 |
| 3-carbamoyl-2-benzylamine | 300 (decomp.) |
| 4-carbamoyl-2-methyl-benzylamine | 215 – 218 |
| 5-carbamoyl-2-methyl-benzylamine | 260 (decomp.) |
| 3-ethoxycarbonyl-phenethylamine | 113 – 115 |
| 4-methoxycarbonyl-phenethylamine | 228 – 229 |
| 4-ethoxycarbonyl-phenethylamine | 195 – 196 |
| 4-carbamoyl-phenethylamine | 298 – 299 |
| 4-carbamoyl-phenethylamine | 262 – 264 |

Adenosine on intravenous administration to mammals and humans produces a vasodilation. In particular, this effect is noticeable in the coronary vascular system wherein a marked increase in blood circulation results from the vasodilation produced by the administration of the adenosine (Berne, Blackman and Gardner, J. clin. Invest. 36, 1101 (1957)). Due to the rapid deamination of the adenosine, however, this effect is extremely transient. N(6)-substituted derivatives of adenosine also exert a marked coronary vasodilating effect of high specificity, but in contrast to adenosine, the effect is a prolonged one.

In order to compare the effectiveness of the novel N(6)-substituted adenosine of this invention on coronary blood circulation with known materials, N(6)-benzyl adenosine, which has already been described in the literature (J. A. Montgomery et al., J. org. Chem. 28, 2304 (1963), was selected as a comparison compound.

An increased blood circulation in the coronary system, provided that there are no significant changes in the myocardial oxygen consumption, results in a reciprocal decrease of the coronary arteriovenous oxygen difference. This decrease in extraction of oxygen from the blood leads to an additional supply of oxygen, i.e., to an improvement in the oxygen supply to the myocardium which is the ultimate aim sought to be achieved with all coronary dilating agents.

For the purpose of obtaining an exact basis for evaluating the results of the tests, the decrease in coronary arteriovenous oxygen difference (at the time of the maximum effect) is reported in volume percent as compared to the starting value. The greater the value reported the more significant was the coronary oxygen supply increase.

The tests were carried out using 32 alert unanesthetized dogs, each weighting between 12 and 16 kg. and following the procedure of Rayford, Huvos and Gregg, Proc. Soc. exp. Biol. Med 113, 876 (1963). Catheters were implanted surgically into the Sinus coronarius, the aorta and the vena cava of the animals whereby it was made possible to photometrically determine the coronary arteriovenous saturation difference (Brinkman, Arch. Chir, Neerl, 1, 177 (1949)) and from the actual hemoglobin values obtained to convert the values into the corresponding volume percents. The compounds were administered intravenously in the amounts indicated in 1 ml. of a 5 percent LUTROL-9-solution (liquid polyethylene oxide, molecular weight about 400, BASF-Ludwigshafen) in 5.5 percent aqueous glucose.

The compounds employed in the tests are set out in Table I, below, in which the results of the tests are also set forth in terms of the decrease in coronary $O_2$ depletion induced by the test compounds.

From Table I, it can be seen that the novel compounds of this invention exhibit marked coronary dilating properties, superior to those of the known Compound A, i.e., N(6)-benzyl-adenosine.

TABLE I

| Compound No. | Compound Name | DOSAGE MG/KG I.V. | DECREASE OF THE CORONARY $O_2$ DEPLETION* |
|---|---|---|---|
| A | N(6)-Benzyl-adenosine | 0.4 | 2.5 |
| 1 | N(6)-(4-Carboxy-phenethyl)-adenosine | 0.2 | 3.3 |
| 2 | N(6)-(4-Methoxycarbonyl-phenethyl)-adenosine | 0.4 | 6.3 |
| 3 | (N(6)-(4-Ethoxycarbonyl-phenethyl)-adenosine | 0.4 | 6.2 |
| 4 | N(6)-(4-Carbamoyl-phenethyl)-adenosine | 0.2 | 5.2 |
| 5 | N(6)-(4-Methylaminocarbonyl-phenethyl)-adenosine | 0.2 | 7.8 |
| 6 | N(6)-(4-Ethoxycarbonyl-phenethyl)-2-bromo-adenosine | 0.4 | 3.0 |
| 7 | N(6)-(4-Methylaminocarbonyl-phenethyl)-2-bromo-adenosine | 0.2 | 5.3 |
| 8 | N(6)-(4-Carbamoyl-benzyl)-2-bromo-adenosine | 0.4 | 3.7 |
| 9 | N(6)-(2-Carboxy-benzyl)-adenosine | 0.2 | 7.4 |
| 10 | N(6)-(2-Carbamoyl-benzyl)-adenosine | 0.4 | 7.0 |
| 11 | N(6)-(3-Carbamoyl-benzyl)-adenosine | 0.4 | 7.9 |
| 12 | N(6)-(5-Carbamoyl-2-methyl-benzyl)-adenosine | 0.4 | 7.1 |
| 13 | N(6)-(2-Methylaminocarbonyl-benzyl)-adenosine | 0.4 | 12.7 |
| 14 | N(6)-(3-Carboxy-benzyl)-adenosine | 0.4 | 7.2 |
| 15 | N(6)-(3-Methoxycarbonyl-benzyl)-adenosine | 0.4 | 7.6 |
| 16 | N(6)-(3-Methylaminocarbonyl-benzyl)-adenosine | 0.4 | 8.8 |
| 17 | N(6)-(3-Carboxy-2-methyl-benzyl)-adenosine | 0.4 | 8.1 |
| 18 | N(6)-(3-Ethoxycarbonyl-2-methyl-benzyl)-adenosine | 0.2 | 9.7 |
| 19 | N(6)-(3-Methylaminocarbonyl-2-methyl-benzyl)-adenosine | 0.2 | 10.2 |
| 20 | N(6)-(3-Carboxy-phenethyl)-adenosine | 0.2 | 3.1 |
| 21 | N(6)-(3-Ethoxycarbonyl-phenethyl)-adenosine | 0.2 | 6.0 |
| 22 | N(6)-(3-Carbamoyl-phenethyl)-adenosine | 0.2 | 7.5 |
| 23 | N(6)-(3-Methylaminocarbonyl-phenethyl)-adenosine | 0.2 | 7.7 |
| 24 | N(6)-(3-Isopropoxycarbonyl-benzyl)-adenosine | 0.4 | 5.5 |
| 25 | N(6)-(3-Carbamoyl-2-methyl-benzyl)-adenosine | 0.2 | 9.5 |
| 26 | N(6)-(4-Ethoxycarbonyl-2-methyl-benzyl)-adenosine | 0.4 | 4.1 |
| 27 | N(6)-(4-Carbamoyl-2-methyl-benzyl)-adenosine | 0.2 | 8.1 |
| 28 | N(6)-(4-Carbamoyl-benzyl)-2-hydroxy-adenosine | 0.4 | 3.9 |
| 29 | N(6)-(3-Ethoxycarbonyl-benzyl)-2-hydroxy-adenosine | 0.4 | 7.1 |
| 30 | N(6)-(4-Carbamoyl-phenethyl)-2-chloro-adenosine | 0.4 | 9.2 |
| 31 | N(6)-(3-Carboxy-benzyl)-2-chloro-adenosine | 0.4 | 3.2 |
| 32 | N(6)-(2-Ethoxycarbonyl-benzyl)-adenosine | 0.4 | 5.9 |
| 33 | N(6)-3-Ethoxycarbonyl-benzyl)-adenosine | 0.4 | 5.7 |
| 34 | N(6)-(4-Ethoxycarbonyl-benzyl)-adenosine | 0.4 | 3.5 |
| 35 | N(6)-(4-Carbamoyl-benzyl)-adenosine | 0.2 | 6.2 |
| 36 | N(6)-(4-Carboxy-benzyl)-adenosine | 2.0** | 1.9 |
| 37 | N(6)-(4-Methylaminocarbonyl-benzyl)-adenosine | 0.4 | 3.3 |
| 38 | N(6)-(4-Carbomyl-benzyl)-2-chloro-adenosine | 0.4 | 5.7 |
| 39 | N(6)-(2-Ethoxycarbonyl-phenethyl)-adenosine | 0.4 | 6.6 |

*At maximum effect in Vol. percent as compared to the starting values
**Oral administration The new compounds (I) according to the present invention and the salts thereof can be administered enterally and parenterally, in admixture with a liquid or solid pharmaceutical diluent or carrier. In this case, there can be used all the usual forms of administration, for example, tablets, capsules, dragees, syrups, solutions, suspensions and the like. As injection medium, it is preferred to use water which contains the additives conventional for injection solutions, such as stabilizing agents, solubilizing agents and buffers. Additives of this kind include, for example, tartrate and citrate buffers, ethanol, complex-forming agents (such as ethylenediamine-tetraacetic acid and the non-toxic salts thereof) and high molecular weight polymers (such as liquid polyethylene oxide) for viscosity regulation. Liquid carrier materials for injection solution must, of course, be sterile and are preferably placed into ampoules. Solid carrier materials include, for example, starch, lactose, mannitol, methyl-cellulose, talc, highly dispersed silicic acid, high molecular weight fatty cids (such s stearic acid), gelatine, agar-agar, calcium phosphate, magnesium stearate, animal and vegetable fats and solid high molecular weight polymers (such as polyethylene glycol); compositions suitable for oral administration can, if desired, contain flavouring and sweetening agents.

It will be understood that the specification and examples are illustrative but not limitative of the present invention and that other embodiments within the spirit and scope of the invention will suggest themselves to those skilled in the art.

What is claimed is:

1. N(6)-Aralkyl-Adenosine compound selected from the group consisting of
   N(6)-3-Ethoxycarbonyl-benzyl-adenosine;
   N(6)-(3-Ethoxycarbonyl-2-methyl-benzyl)-adenosine;
   N(6)-(4-methoxycarbonyl-phenethyl)-adenosine;
   N(6)-(4-ethoxycarbonyl-benzyl)-2-chloroadenosine;
   N(6)-(3-methoxycarbonyl-benzyl)-adenosine;
   N(6)-(2-ethoxycarbonyl-benzyl)-adenosine;
   N(6)-(4-ethoxycarbonyl-benzyl)-adenosine;
   N(6)-(3-isopropoxycarbonyl-benzyl)-adenosine;
   N(6)-(5-ethoxycarbonyl-2-methyl-benzyl)-adenosine;
   N(6)-(3-ethoxycarbonyl-phenethyl)-adenosine;
   N(6)-(4-ethoxycarbonyl-phenethyl)-adenosine;
   N(6)-(4-ethoxycarbonyl-2-methyl-benzyl)-adenosine;
   N(6)-(3-ethoxycarbonyl-benzyl)-2-chloroadenosine;
   N(6)-(4-methoxycarbonyl-phenethyl)-2-chloroadenosine;
   N(6)-(3-ethoxycarbonyl-benzyl)-2-bromoadenosine;
   N(6)-(4-ethoxycarbonyl-phenethyl)-2-bromoadenosine;
   N(6)-(3-ethoxycarbonyl-benzyl)-2-hydroxy-adenosine;
   N(6)-(2-ethoxycarbonyl-phenethyl)-adenosine;
   N(6)-(4-carboxy-benzyl)-adenosine;
   N(6)-(3-carboxy-2-methyl-benzyl)-adenosine;
   N(6)-(2-carboxy-benzyl)-adenosine;
   N(6)-(3-carboxy-benzyl)-adenosine;
   N(6)-(5-carboxy-2-methyl-benzyl)-adenosine;
   N(6)-(3-carboxy-phenethyl)-adenosine;
   N(6)-(4-carboxy-phenethyl)-adenosine;
   N(6)-(4-carboxy-2-methyl-benzyl)-adenosine;
   N(6)-(3-carboxy-benzyl)-2-chloroadenosine;
   N(6)-(3-carbamoyl-benzyl)-adenosine;
   N(6)-(3-carbamoyl-phenethyl-adenosine;
   N(6)-(2-carbamoyl-benzyl)-adenosine;
   N(6)-(4-carbamoyl-benzyl)-2-chloroadenosine;
   N(6)-(4-carbamoyl-benzyl)-adenosine;
   N(6)-(5-carbamoyl-2-methyl-benzyl)-adenosine;
   N(6)-(4-carbamoyl-phenethyl)-adenosine;
   N(6)-(3-carbamoyl-2-methyl-benzyl)-adenosine;
   N(6)-(4-carbamoyl-2-methyl-benzyl)-adenosine;
   N(6)-(4-carbamoyl-phenethyl)-2-chloroadenosine;
   N(6)-(4-carbamoyl-benzyl)-2-bromoadenosine;
   N(6)-(4-carbamoyl-benzyl)-2-hydroxy-adenosine;
   N(6)-(2-methylaminocarbonyl-benzyl)-adenosine;
   N(6)-(3-methylaminocarbonyl)-phenethyl-adenosine;
   N(6)-(3-methylaminocarbonyl-benzyl)-adenosine;
   N(6)-(4-methylaminocarbonyl-benzyl)-adenosine;
   N(6)-(3-methylaminocarbonyl-2-methyl-benzyl)-adenosine;
   N(6)-(4-methylaminocarbonyl-phenethyl)-adenosine;
   N(6)-(4-methylaminocarbonyl-phenethyl)-2-bromoadenosine;
   and the physiologically compatible salts thereof.

2. Compound as claimed in claim 1, designated N(6)-(3-ethoxycarbonyl-benzyl)-adenosine.

3. Compound as claimed in claim 1, designated N(6)-(4-methoxycarbonyl-phenethyl)-adenosine.

4. Compound as claimed in claim 1, designated N(6)-(4-ethoxycarbonyl-benzyl)-2-chloroadenosine.

5. Compound as claimed in claim 1, designated N(6)-(3-methoxycarbonyl-benzyl)-adenosine.

6. Compound as claimed in claim 1, designated N(6)-(2-ethoxycarbonyl-benzyl)-adenosine.

7. Compound as claimed in claim 1, designated N(6)-(4-ethoxycarbonyl-benzyl)-adenosine.

8. Compound as claimed in claim 1, designated N(6)-(3-isopropoxycarbonylenzyl)-adenosine.

9. Compound as claimed in claim 1, designated N(6)-(5-ethyoxycarbonyl-2-methyl-benzyl)-adenosine.

10. Compound as claimed in claim 1, designated N(-6)-(3-ethoxy-carbonyl-phenethyl)-adenosine.

11. Compound as claimed in claim 1, designated N(-6)-(4-ethoxycarbonyl-phenethyl)-adenosine.

12. Compound as claimed in claim 1, designated N(-6)-(4-ethoxycarbonyl-2-methyl-benzyl)-adenosine.

13. Compound as claimed in claim 1, designated N(-6)-(3-ethoxycarbonyl-benzyl)-2-chloroadenosine.

14. Compound as claimed in claim 1, designated N(-6)-(4-methoxycarbonyl-phenethyl)-2-chloroadenosine.

15. Compound as claimed in claim 1 designated N(6)-(3-ethoxycarbonyl-2-methyl-benzyl)-adenosine.

16. Compound as claimed in claim 1 designated N(6)-(3-methylaminocarbonyl-2-methyl-benzyl)-adenosine.

17. Compound as claimed in claim 1 designated N(6)-(3-carbamoyl-2-methyl-benzyl-adenosine.

18. Compound as claimed in claim 1 designated N(6)-(4-carbamoyl-2-methyl-benzyl)-adenosine.

* * * * *

UNITED STATES PATENT OFFICE
CERTIFICATE OF CORRECTION

Patent No. 3,817,981    Dated June 18, 1974

Inventor(s) Wolfgang Kampe, Erich Fauland, Harald Stork, Wolfgang Juhran and Karl Dietmann It is certified that error appears in the above-identified patent and that said Letters Patent are hereby corrected as shown below:

Col. 2, line 32, in the formula, "y-y" should be --y-x--.

Col. 4, line 12, "150" should be --105°--.

Col. 5, line 1, delete the symbol "°" after "2".

Col. 8, line 61, after "3-carbamoyl" insert -- methyl --.

Col. 8, line 65, change "4-carbamoyl" to --4-carboxy--.

Col. 11, line 21, change "cids" to --acids--.

Col. 12, line 43, correct the spelling of isopropoxycarbonylbenzyl.

Col. 11, line 21 "s" should read -- as --.

Signed and sealed this 12th day of November 1974.

(SEAL)
Attest:

McCOY M. GIBSON JR.
Attesting Officer

C. MARSHALL DANN
Commissioner of Patents